(12) United States Patent
Symes et al.

(10) Patent No.: US 9,304,200 B2
(45) Date of Patent: Apr. 5, 2016

(54) IDENTIFICATION, DETECTION AND POSITIONING OF UNDERWATER ACOUSTIC REFLECTORS

(75) Inventors: Lisa Jane Symes, Weymouth (GB); Carl Peter Tiltman, Weymouth (GB)

(73) Assignee: Subsea Asset Location Technologies Limited, Dorset (GB)

( * ) Notice: Subject to any disclaimer, the term of this patent is extended or adjusted under 35 U.S.C. 154(b) by 423 days.

(21) Appl. No.: 13/976,234

(22) PCT Filed: Jan. 18, 2012

(86) PCT No.: PCT/GB2012/050096
§ 371 (c)(1),
(2), (4) Date: Jun. 26, 2013

(87) PCT Pub. No.: WO2012/101423
PCT Pub. Date: Aug. 2, 2012

(65) Prior Publication Data
US 2013/0272092 A1    Oct. 17, 2013

(30) Foreign Application Priority Data

Jan. 25, 2011 (GB) .................................. 1101278.8
Aug. 6, 2011 (GB) .................................. 1113583.7
Aug. 6, 2011 (GB) .................................. 1113584.5

(51) Int. Cl.
| | | |
|---|---|---|
| B06B 1/06 | (2006.01) |
| G01S 15/06 | (2006.01) |
| G01S 7/527 | (2006.01) |
| G01S 7/539 | (2006.01) |
| G01V 1/38 | (2006.01) |
| G10K 11/20 | (2006.01) |

(52) U.S. Cl.
CPC ................. *G01S 15/06* (2013.01); *G01S 7/527* (2013.01); *G01S 7/539* (2013.01); *G01V 1/3835* (2013.01); *G10K 11/205* (2013.01)

(58) Field of Classification Search
CPC ...................................................... G10K 11/205
USPC .................................................. 367/141, 151
See application file for complete search history.

(56) References Cited

U.S. PATENT DOCUMENTS

| | | | | |
|---|---|---|---|---|
| 5,822,272 A * | 10/1998 | Ream, Jr. | ............... | G01V 15/00 367/131 |
| 8,077,539 B2 * | 12/2011 | Smith | .................. | G10K 11/205 367/2 |
| 8,162,098 B2 * | 4/2012 | Emery | ................. | G10K 11/205 181/175 |

FOREIGN PATENT DOCUMENTS

| | | |
|---|---|---|
| GB | 2 458 810 | 10/2009 |
| WO | WO 2009/122184 | 10/2009 |
| WO | 2011/012877 A2 | 2/2011 |
| WO | 2012/007742 A1 | 1/2012 |
| WO | 2012/007743 A2 | 1/2012 |

OTHER PUBLICATIONS

International Search Report for PCT/GB2012/050096 mailed Jan. 30, 2013.
R. Barr et al., "Target Phrase: An Extra Dimension for Fish and Plankton Target Identification", J. Acoust. Soc. Am., vol. 118 #3, Sep. 2005, pp. 1358-1371.

* cited by examiner

*Primary Examiner* — Mark Hellner
(74) *Attorney, Agent, or Firm* — Nixon & Vanderhye, P.C.

(57) ABSTRACT

A method of identifying and locating an acoustic reflector is described by interrogating underwater objects with a sonar and deploying one or more of the steps of • a. identifying objects that apparently reflect the acoustic interrogation with a double echo, measuring the separation of the two echoes and comparing those measurements with anticipated measurements for underwater acoustic reflectors that may be present in the search area, and accepting or rejecting the reflected acoustic wave as potentially including the echo from the front of such an acoustic reflector and the echo from the shell at the rear of the reflector; • b. measuring the target strength of the echoes in a double echo received from an object and rejecting the object as one of interest if the target strength in the first echo of a double echo exceeds that of the second echo; • c. measuring the total target strength of an echo from an object, the object being rejected as being a potential underwater acoustic reflector of interest if the target strength is less than a predetermined minimum; • d. measuring the acoustic width of an object and comparing that with the acoustic width of known acoustic reflectors, the object being rejected as being potentially an underwater acoustic reflector of interest if the acoustic width is not that of a known underwater acoustic reflector; • e. measuring the frequency response of an object, the object being accepted or rejected as being potentially an acoustic reflector of interest if the frequency response corresponds to the known frequency response of such an underwater reflector; and • f. measuring the phase response of an object, the object being accepted or rejected as potentially an underwater acoustic reflector of interest if the phase response corresponds to the known phase response of such an underwater acoustic reflector. The target is being rejected as being an acoustic reflector of interest if the measured characteristics do not match the known characteristics of a reflector of interest.

20 Claims, 6 Drawing Sheets

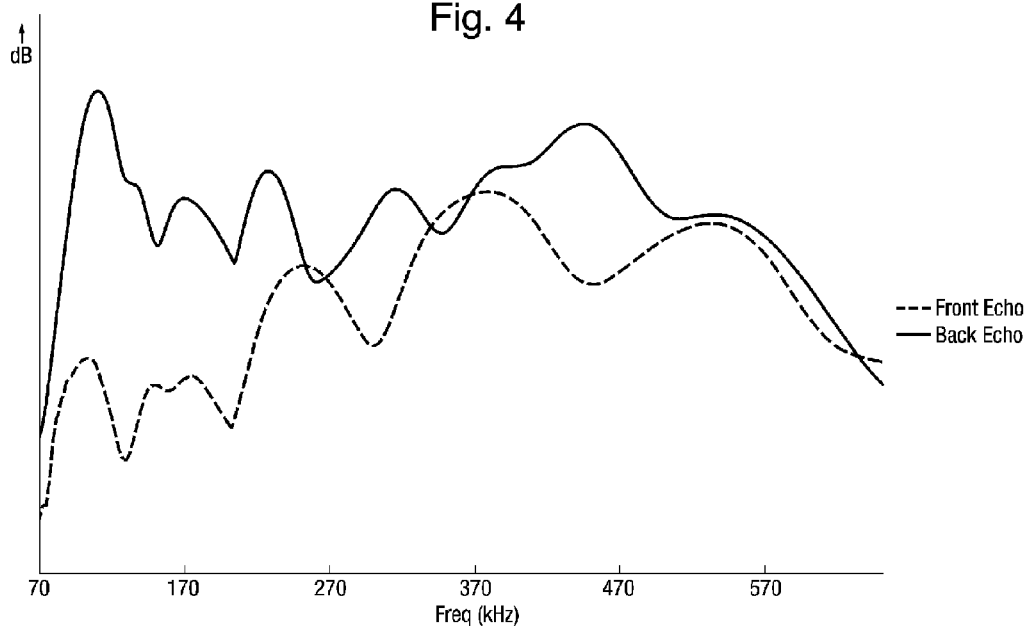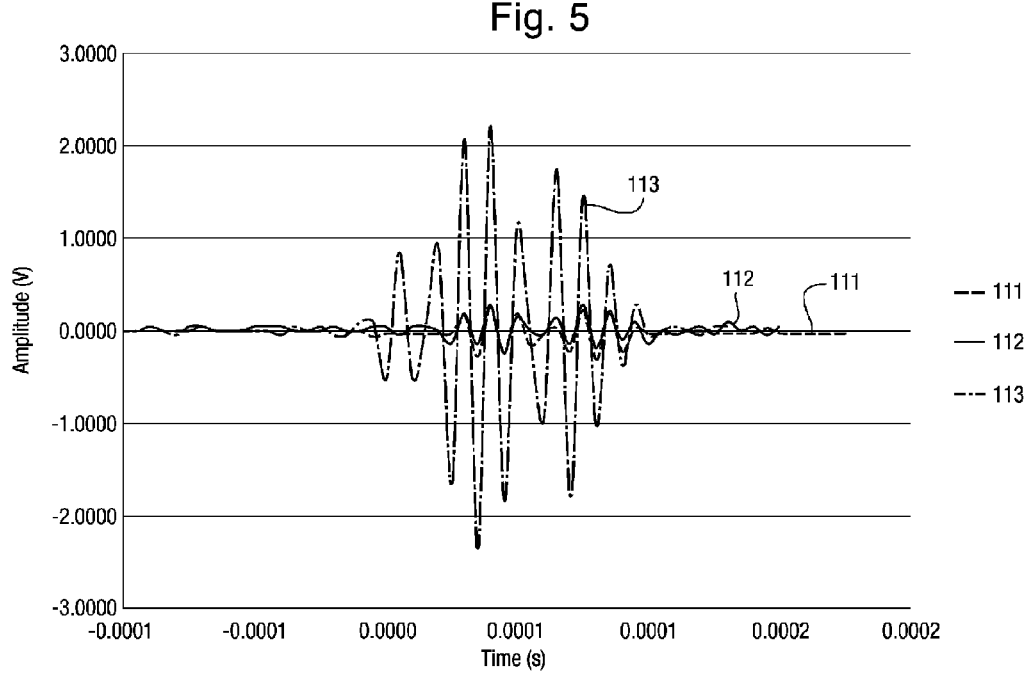

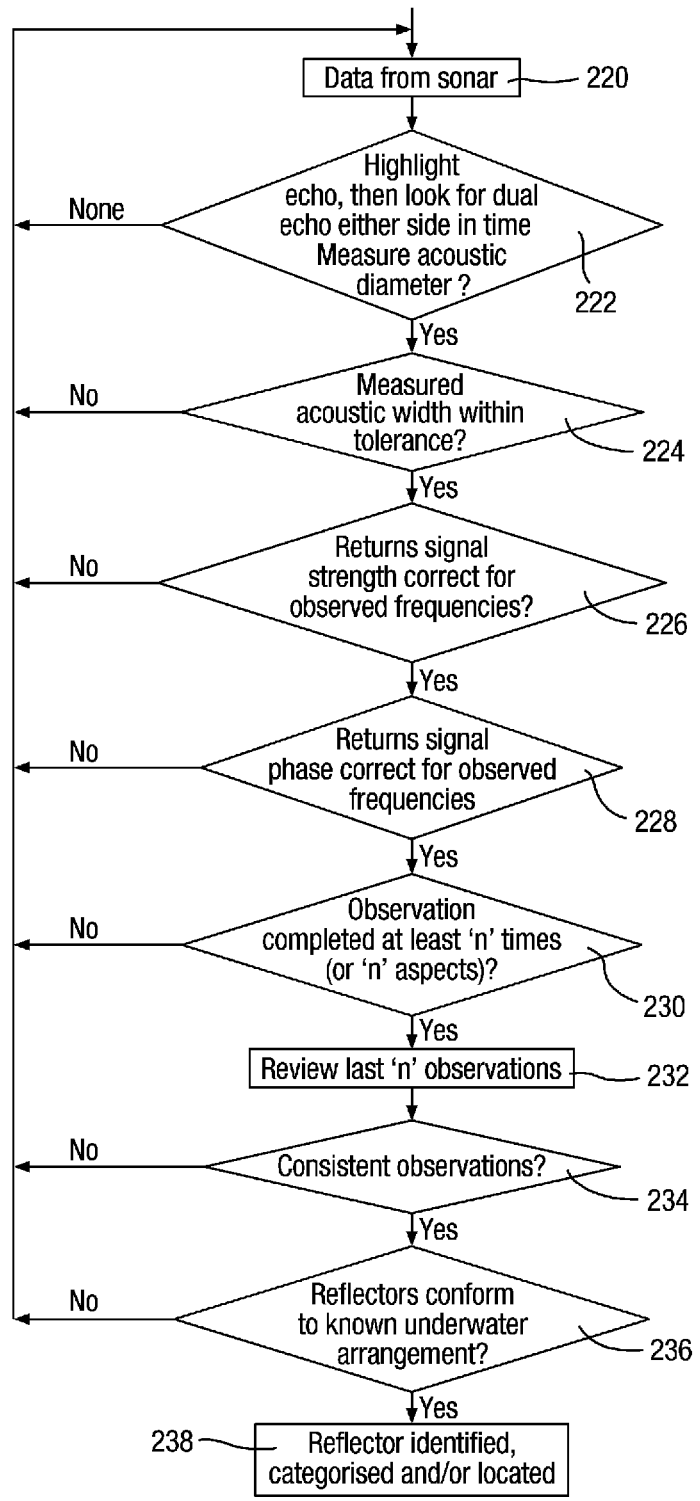

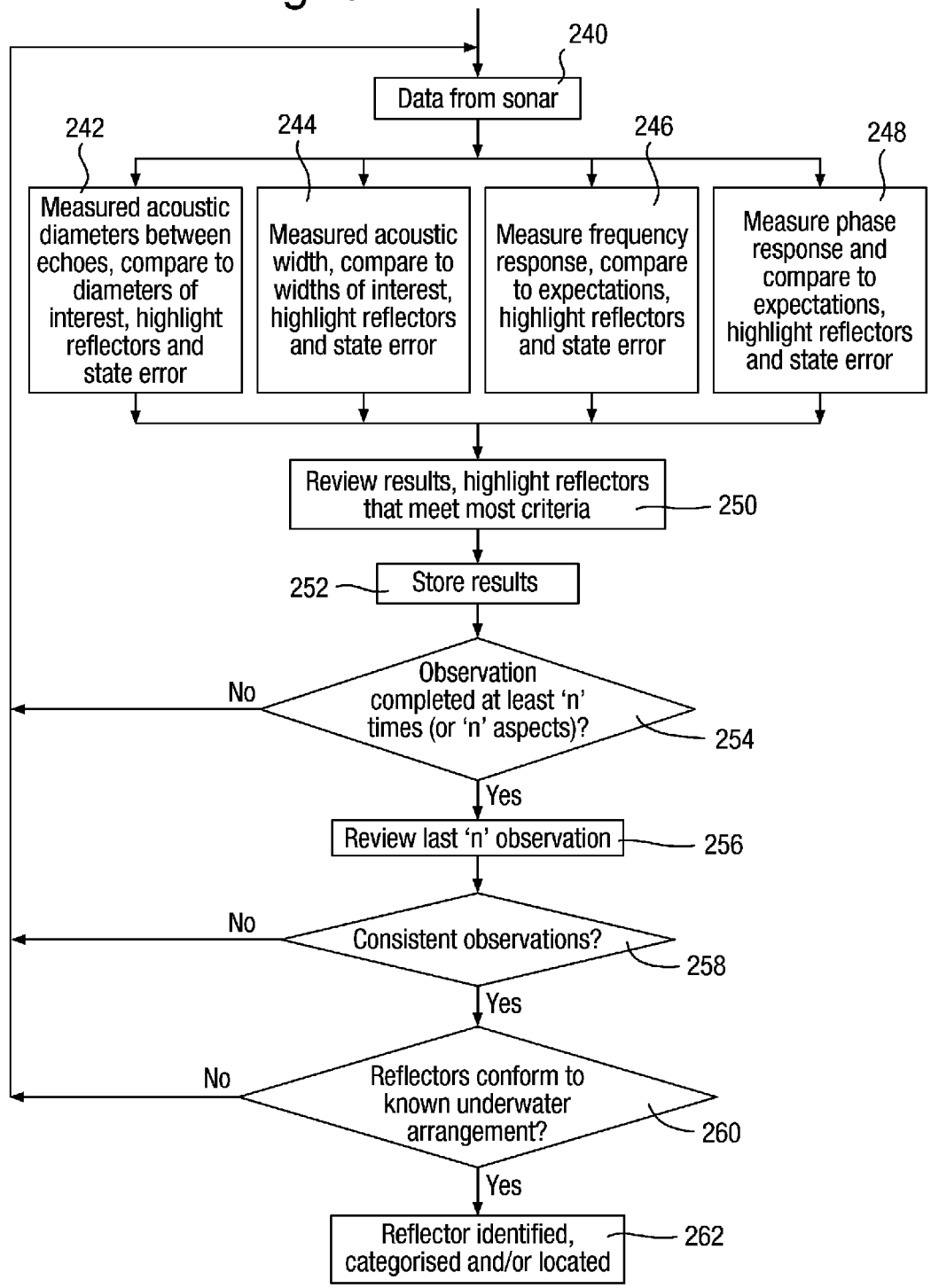

IDENTIFICATION, DETECTION AND POSITIONING OF UNDERWATER ACOUSTIC REFLECTORS

This application is the U.S. national phase of International Application No. PCT/GB2012/050096 filed 18 Jan. 2012 which designated the U.S. and claims priority to GB 1101278.8 filed 25 Jan. 2011, GB 1113583.7 filed 6 Aug. 2011, and GB 1113584.5 filed 6 Aug. 2011, the entire contents of each of which are hereby incorporated by reference.

This invention relates to a method of identifying underwater acoustic reflectors by means of observing their characteristic features and to a method of recording their absolute position.

GB2458810A (The Secretary of State for Defence) and WO2011/012877, PCT/GB2011/051298 and PCT/GB2011/051299 (all Subsea Asset Location Technologies Limited), for example, describe acoustic reflectors for underwater use. Broadly, an acoustic reflector for underwater use comprising a shell surrounding a core, said shell acoustic waves, at certain frequencies may pass, in part at least, into the core to be reflected back from the back of the shell opposite said window(s). All said citations are incorporated by reference. Some of the radiation is focussed on the back interior wall and some travels around the shell of the reflector to interfere constructively with the radiation which passed through the core, the combined wave being reradiated from the reflector towards the source of the incident radiation.

In each of the above cases, best performance is obtained if the shell and core materials are chosen so that the ratio of the speed of sound wave transmission in the shell to the average speed of the wave transmission in the core is in the range 2.5 to 3.4 or a multiple thereof. Preferably this ratio is in the range 2.74 to 2.86 inclusive or a multiple thereof.

When once such an acoustic reflector is laid it is desired to identify the reflector and to plot its position. A solution to the need is described in this specification; this solution also provides a method of mapping absolutely a pipeline or other object onto which one or more of such reflectors are attached.

In one aspect of the invention a method of identifying and locating an underwater acoustic reflector having a shell surrounding a core wherein an incident acoustic wave may be partially reflected by the front of the reflector and partially pass into the core to be reflected from the shell at the rear of the reflector by acoustically interrogating an underwater search area in which such an acoustic reflector may be present, two or more of the steps of a. identifying objects that apparently reflect the acoustic interrogation with a double echo, measuring the separation of the two echoes and comparing those measurements with anticipated measurements for underwater acoustic reflectors that may be present in the search area, and accepting or rejecting the reflected acoustic wave as potentially including the echo from the front of such an acoustic reflector and the echo from the shell at the rear of the reflector;

b. measuring the target strength of the echoes in a double echo received from an object and rejecting the object as one of interest if the target strength in the first echo of a double echo exceeds that of the second echo;

c. measuring the total target strength of an echo from an object, the object being rejected as being a potential underwater acoustic reflector of interest if the target strength is less than a predetermined minimum;

d. measuring the acoustic width of an object and comparing that with the acoustic width of known acoustic reflectors, the object being rejected as being potentially an underwater acoustic reflector of interest if the acoustic width is not that of a known underwater acoustic reflector;

e. measuring the frequency response of an object, the object being accepted or rejected as being potentially an acoustic reflector of interest if the frequency response corresponds to the known frequency response of such an underwater reflector; and f. measuring the phase response of an object, the object being accepted or rejected as potentially an underwater acoustic reflector of interest if the phase response corresponds to the known phase response of such an underwater acoustic reflector.

In one aspect of the invention the method of identifying and locating an underwater reflector according to the invention includes the step of measuring the acoustic diameter of an object and comparing that diameter with known acoustic diameters for underwater acoustic reflectors that may be present in the search area, and thus accepting or rejecting the reflected acoustic wave as being one potentially of interest.

Where the total target strength of an echo is measured and the echo is rejected as potentially coming from an underwater acoustic reflector of interest if the target strength is less than a predetermined minimum. A typical pre-set minimum might be −15 dB or −10 dB.

This invention thus identifies the characteristic features of an acoustic reflector for underwater use comprising a shell surrounding a core, said shell acoustic waves, at certain frequencies may pass, in part at least, into the core to be reflected back from the back of the shell opposite said window(s), those features being able to be used separately or in combination, for the purposes of identifying, categorising and/or locating an acoustic reflector. In addition, example methods are described that demonstrates how the observed characteristics may be combined to provide a practical system for identifying, categorising and/or locating.

Furthermore additional methods of identifying an acoustic reflector are described; firstly taking multiple observations of the reflector and secondly by comparing the observed arrangement of reflectors with the known arrangement of reflectors placed underwater. When such a reflector is spherical and thus omni-directional, observations can be made from two or more directions to confirm the likelihood that the reflector is one of interest. Likewise if the reflector of interest is not omni-directional that information can be used when observations are taken from different directions, comparing the measurements with the anticipated behaviour of such an acoustic reflector.

The measurements selected from those set out above to identify an acoustic reflector are preferably repeated at least three times by interrogating an object from three different aspects. Assuming consistent results from each of the three sets of measurement, there is a high probability that the object is an acoustic reflector of interest.

This invention also provides a method of identifying and distinguishing underwater acoustic reflectors of the kind described in the previous paragraph from one another. When a sonar wave is directed at the reflector, the wave is partially reflected from the front face of the reflector, but part of the wave enters the shell of the reflector and passes into the interior of the core to be focussed and reflected from the rear of the shell. The focussing means that the return pulse from the rear of the shell is stronger than the reflected pulse from the front of the shell, providing a characteristic response from this kind of acoustic reflector.

In the majority of cases the acoustic reflectors of interest will be spherical, in this context 'the front' of the reflector is the first surface of the reflector encountered by an incident acoustic wave, and the back is part of the shell immediately opposite the centre of the incident radiation of the front of the shell. If the reflector is generally cylindrical or ovoid, 'front' and 'back' have meanings similar to those described in respect of spherical reflectors.

With a spherical or cylindrical reflector, the acoustic width is the measured diameter of the sphere or cylinder measured normally to the direction of the incident acoustic radiation, the acoustic diameter is measured front to back.

The method can be developed further to one of plotting the shape of a structure such as an underwater pipeline. The identification and measurement of an acoustic diameter of a spherical or cylindrical reflector attached to a pipeline, gives rise to the appearance that the rear of an acoustic reflector as described and used herein is further away from interrogating sonar than it really is. As a result, by choosing the diameter of the reflector and other parameters appropriately, the back echo can appear to a sonar system to be coming from within the structure to which the reflector is attached.

In a still further aspect of the invention a method of plotting the position of one or more underwater acoustic reflectors includes the steps of directing a sonar at a possible underwater acoustic reflector, identifying a sonar reflector as an acoustic reflector of interest, plotting the relative position of the acoustic reflector in relation to the sonar receiver, plotting the absolute position of the sonar receiver in a geographical information system, combining the position information of the acoustic reflector of interest relative to the receiver with the absolute position of the receiver, to define an absolute position of the acoustic reflector of interest in a geographic information system. In this way the absolute position of such a passive acoustic reflector of interest can be recorded.

If a series of such passive acoustic reflectors is used to mark an underwater object, for example, a pipeline, the absolute position of each can be recorded and thus the absolute position and route of the object recorded.

The invention will be further described, by way of example only, with reference to the accompanying drawings, in which FIGS. 1A, 1B, and 1C show components of an embodiment of a typical underwater acoustic reflector for use in connection with the present invention;

FIG. 4 is an example of the frequency response obtained from an underwater acoustic reflector as shown in FIGS. 1 and 2;

FIG. 5 is an example of the phase shift between front and back echoes from an underwater acoustic reflector as shown in FIGS. 1 and 2;

FIG. 7 is a flow diagram showing a method according to the invention of identifying an underwater acoustic reflector and in which each step is carried out sequentially;

FIG. 8 is a flow diagram showing a method according to the invention of identifying an underwater acoustic reflector and in which the steps are carried out concurrently 0;

Figure 1A:
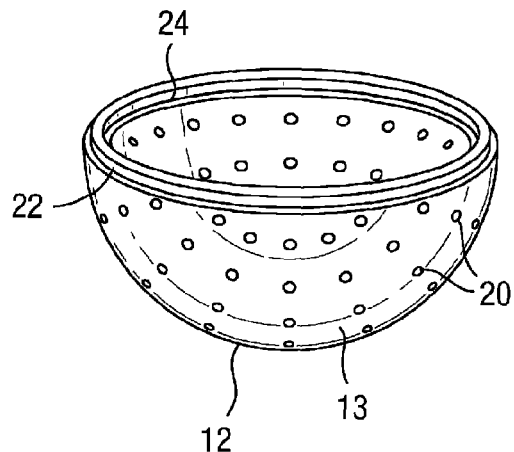
Figure 1B:
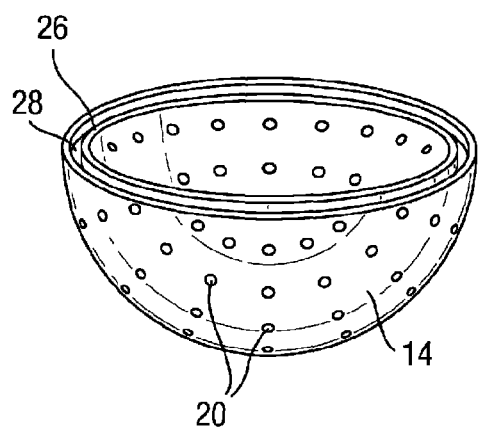
Figure 1C:
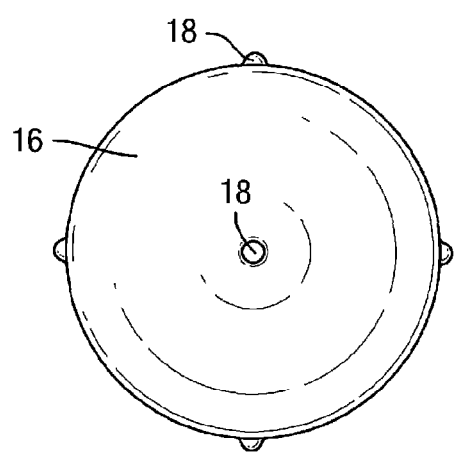

In FIGS. 1A to 1C the components of a typical acoustic reflector (shown as 10 in FIG. 2) for use underwater according to this invention are shown. Two hemispheres 13 and 14 comprise the shell 12 of a spherical acoustic reflector. The hemispheres are made of aluminium alloy 6061T2. The core 16 of the reflector is cast RTV12 and is shown in FIG. 1C. The general diameter of the core 16 is such that it is very slightly smaller, at ambient temperature, than the inside diameter of the shell when the two hemispheres 13 and 14 are assembled together. The core 16 has a plurality of up-standing pimples 18 distributed evenly around the outside of the core. In practice, a minimum of five pimples is needed, but eight to ten have been successfully used for manufacture. The pimples are about 1.3 mm high.

One or more holes 20 are provided in the hemispheres 13 and 14. It is preferred that a large number of small holes each about 1 to 2 mm in diameter be provided to ensure that all the internal air is vented from the inside of the reflector when it is immersed in waters and for water to fill any gaps between the inside of the shell and the core. Two largish holes could be used, but one hole alone risks being blocked when the reflector comes to rest on the sea bed. In this example, at least twenty-four holes are provided, but spheres made with more than ten operate satisfactorily. A tongue 22 is provided around the rim 24 of one of the hemispheres 13. A groove 26 is provided on the rim 28 of the other hemisphere 14 to receive tongue 22 when the hemispheres 13 and 14 are assembled together.

RTV12 for the core 16 is initially poured into a shaped mould with the pimples and cured in a conventional way. The mould is overfilled leaving a sprue to reduce the opportunity for fissures to form. The sprue is then cut off once the core has cured. Subsequently the RTV 12 core 16 is placed in one of the hemispheres, say 14. The other hemisphere, say 13, is then placed over the core 16 with the tongue 22 of hemisphere 13 engaging within the groove 26 associated with the other hemisphere 14. This can be seen in more detail in FIG. 2. The pimples 18 hold the core 16 centrally within the shell 12, with a gap 19 between the inside of the shell and the core. When the assembled reflector is immersed in water, water enters through the holes 20 filing the gap 19. It should be noted that for clarity, the figures are not to scale, and in particular in FIG. 2 the gap 19 is actually slimmer than would appear in the drawing being normally about 1.3 mm. Other forms of construction of such acoustic reflectors are being developed and are encompassed by this invention which is not limited to the particular form of construction descried in this paragraph.

The two hemispheres 13 and 14 are then glued together around the core using an aluminium bonding epoxy ensuring that no air is trapped in the glued joint.

An acoustic reflector having an aluminium alloy 6061T6 shell and an RTV12 core has a shell to core velocity ratio of about 6.1, a multiple of the ideal ration as described. This ratio can be altered by changing the constituents of the alloy.

Other underwater acoustic reflectors have been made using a non-metallic shell. The inventor has found that a shell manufactured with 25% glass fibre reinforced polyphthalamide with a silicon elastomeric core of RTV12 produces excellent reflection of incident acoustic waves at specific frequencies. 25% glass fibre reinforced polyphthalamide is sold under the trade name Zytel® HTN51G25HSL by E.I. du Pont de Nemours and Company. A similar glass fibre reinforced polyphthalamide is marketed under the trade mark Amadel by Solvey S A. Polyphthalamides with higher glass fibre content are obtainable and provide harder shells, but as the glass fibre content increases so does the brittleness of the final shell and the speed of acoustic transmission in the shell. For optimum performance, the latter must be matched by using a core having a higher wave speed than RTV12 itself.

Other suitable non-metals to form the shell include epoxy impregnated Nylon6, carbon fibre, Kevlar® (aramid) fibre, Zylon® [poly(p-phenylene-2,6-benzobisoxazole) or PBO] fibre impregnated with epoxy resin, and epoxy impregnated polythene fibre (e.g. Dyneema®). By varying the amount of fibre in the composite, the speed of sound can be adjusted to match the application. Polyurethane also is an effective shell material. By using the information herein concerning the best ratio of shell to core acoustic velocity ratios, a core material can be selected to yield best performance.

In the case of a non-metal shell, the two hemispherical halves can be joined by including circumferential indent on an a face of the groove 26 looking into the groove itself, with a corresponding circumferential raised portion on the face of the tongue facing the indent which circumferential portion latches into the indent.

The materials of acoustic reflectors with non-metal shells are chosen so that the ration of the acoustic velocity of the shell to that of the core is in the preferred range.

Figure 3:
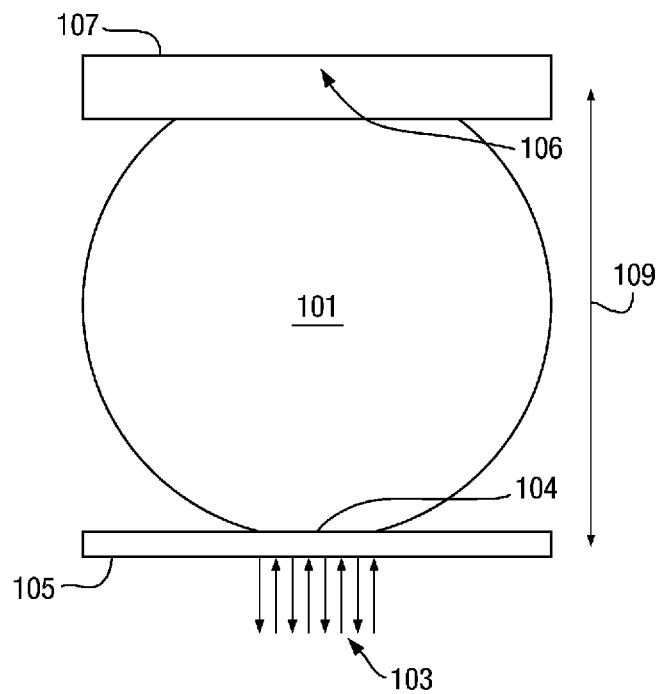
FIG. 3 is an example of a double echo, and its acoustic diameter, of an underwater acoustic reflector as shown in FIGS. 1 and 2.

Turning to FIG. 3, which shows a 200 mm diameter spherical underwater acoustic reflector 101 with a Zytel® HTN51G25HSL shell and an RTV12 core. The reflector 101 is interrogated by an underwater acoustic sonar 103 operating at 675 kHz. Part of the interrogating wave is reflected from the front of the reflector 104; however, because of the accuracy of the sonar the reflection 105 from the front of the reflector 101 places the front typically to within +/−1 mm of its correct position; the actual accuracy may vary depending on the sonar used.

Part of the acoustic wave passes into the core of the reflector and is reflected from the back of the reflector, part of the incident acoustic wave passes around the wall of the shell to combine constructively with the wave passing through the core. The wave returning from the back of the reflector, places the back of the reflector to within +/−1 mm, this may vary depending on the specific sonar used. If it is assumed that the acoustic velocity in the elastomeric core is 1018 m/s (that of RTV 12) and the acoustic velocity of sea water is 1500 m/s (it is actually about 1433 m/s around the United Kingdom and 1514 m/s in much of the Pacific Ocean), the apparent diameter (or acoustic diameter) of the reflector measured by half the separation of the double echoes from the front and back of a reflector of the kind described herein (because the acoustic wave passes twice through the core, once before it is reflected off the shell at the rear of the reflector and once after being reflected from the shell at the rear of the reflector) is about 47% greater than the real diameter.

The precise set up of the sonar will affect the measured acoustic diameter, and the accuracy of the detection of the front and back of the acoustic reflector. Lower frequency operation, in particular, affects accuracy, but the principle is the same.

The actual acoustic diameter is half the separation of the individual echoes in a double echo received from the front and back of a reflector, represented by the front and rear walls in the reflected signal because a signal entering the core traverses the core twice, once before reflection and once after.

Typical acoustic diameters measured are as in table 1 below:

TABLE 1

Comparison of Actual Diameter with typical acoustic diameters

| Actual Diameter | Acoustic Diameter |
|---|---|
| 50 mm | 74 mm |
| 100 mm | 147 mm |
| 200 mm | 294 mm |

Use can be made of information about the frequency response of an acoustic reflector of interest. In FIG. 4, the frequency response of a spherical acoustic reflector 200 mm in diameter with an 8.8 mm thick 25% glass fibre reinforced polyphthalamide shell with an RTV12 core is reviewed. The maximum responses occur at frequencies of 120 kHz and 450 kHz, lesser maxima occur at 170 kHz, 250 kHz, 350 kHz and 570 kHz.

In this reflector there is peak response at a lower frequency, however, responses at frequencies below about 70 kHz are not shown. The frequency response information can be used to finger print the reflector by observing the shape and magnitude of the individual reflected echoes and the combined reflection. The peak responses will occur at different frequencies for reflectors of different sizes, different material compositions, and different shell thicknesses. Each structure has its own unique response 'fingerprint'. It should be noted that practical sonars do not have a sufficiently wide operating frequency range to observe the complete frequency response of a reflector, therefore only portions of the response will be observed.

FIG. 4 also illustrates two other characteristics which are useful in identifying acoustic reflectors of interest. Firstly, the echo from the rear of the reflector is stronger at almost all frequencies than that from the front of the reflector. This is a very characteristic feature of the reflectors shown in FIGS. 1 and 2 and can be used to distinguish these reflectors from other objects in the water. Secondly, where the total target strength of an echo from an object is measured and the object can be rejected as being a potential underwater acoustic reflector of interest if the target strength is less than a predetermined minimum. For example, all peak responses will be 'heard' when the target echo strength being considered is more than a pre-set minimum of −15 dB, a lesser number will be 'heard' at −10 dB. This can be used to distinguish the reflectors of interest from other undersea objects where the target echo strength will generally be lower than −15 dB.

In FIG. 5, curve 111 shows the acoustic wave form of a sonar transmission, curve 112 shows the echo of the transmission from the front of the reflector, and curve 113 the echo from the rear of the reflector. It should be noted that in FIG. 5 the acoustic wave form 111 of the transmitted signal has be scaled down a little in proportion to the echo for clarity. Apart from noting the very strong reflection from the back of the reflector it can be seen that there is a phase shift as between the transmission and the echoes from front and back, and indeed between the front echo and the back echo. In this example the phase shift in the front echo was 36° and in the back echo 48°. The actual shift obtainable varies according to the materials of the reflector and the interrogation acoustic signal. Typical phase shifts are 30° to 40° for the front and 40° to 50° for the back; these values can be calibrated for each type of reflector and sonar combination and used to identify particular reflectors as described. The phase shift for the front and back echoes can be measured across a range of frequencies and thus a phase response for an acoustic reflector can be determined. An interrogating sonar can then observe the phase at its frequency(s) of operation and compare that to those observed from the acoustic reflector of interest and rejected if the measured phase is not consistent with expectations.

Figure 6A:
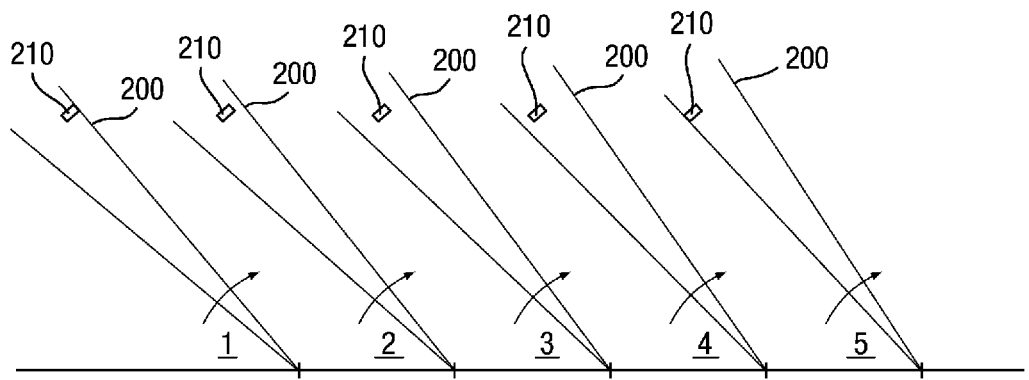
FIGS. 6A, 6B and 6C illustrate the measurement of acoustic width of an underwater acoustic reflector.
Figure 6B:
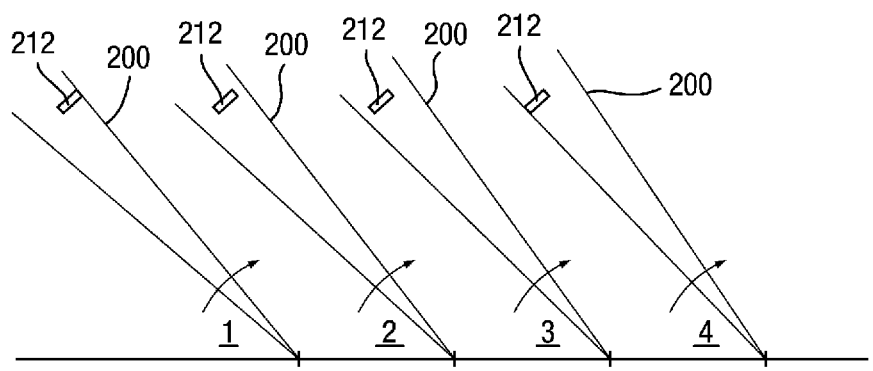
Figure 6C:
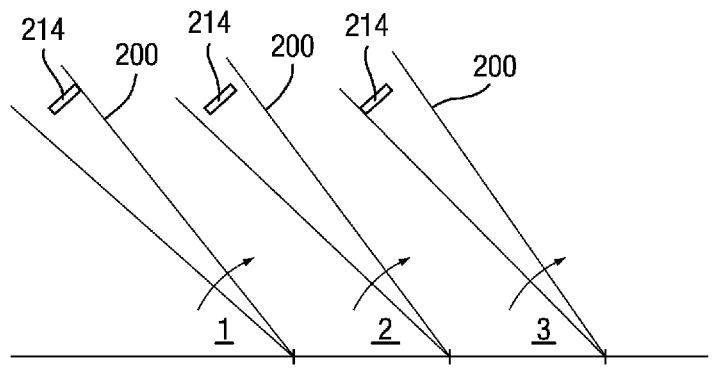

FIGS. 6A, 6B and 6C illustrate the method used in connection with the present invention to measure the acoustic width of an underwater acoustic reflector. In these figures an object is interrogated by a clockwise rotating sonar beam having a width of 10°, with a step angle of 2°. Such sonar systems operating using consecutive beams allow the acoustic width of an acoustic reflector to be measured. This is the method used by this invention to identify, categorise and/or locate a reflector. In FIG. 6A, a sonar operating using consecutive beams 200 interrogates an area containing a small acoustic reflector 210. In five consecutive beams at positions 1, 2, 3, 4 and 5 the reflector produces a double echo response. It is a characteristic of acoustic reflectors of interest in this invention, that they do not produce a response when the reflector is only partially in the beam, as might be the case if the beam had moved beyond position 5 or was before position 1. In FIG. 6B, a larger reflector 212 is shown (alternatively it can be a smaller reflector closer to the source sonar). In this case the reflector is only seen in four consecutive beams. In FIG. 6C, the object of interest 214 is even bigger, or still closer to the sonar, and it is only seen in three consecutive beams. By knowing the angular step size between the beams, the beam width and the distance of the reflector from the sonar, the acoustic width of the reflector can be measured. This measurement allows a reflector to be accepted or rejected as a reflector of interest.

The precise set up and design of the sonar and distance between the sonar and reflector will affect the acoustic width measured and the accuracy of the measurement. Wide sonar beam-width and large angular beam step sizes particularly affect accuracy, but the principle is the same.

Unlike the acoustic diameter, the acoustic width is equal to the physical diameter of the acoustic reflector. Therefore acoustic widths are in table 2 below:

TABLE 2

Comparison of Actual Diameter with Acoustic Width

| Actual Diameter | Acoustic Width |
| --- | --- |
| 50 mm | 50 mm |
| 100 mm | 100 mm |
| 200 mm | 200 mm |

In FIG. 7 is a flow diagram showing a method according to the invention for identifying an underwater acoustic reflector and in which the steps are carried out sequentially. Initially an acoustic signal is transmitted from sonar (box 220). Echoes from reflectors are received and corrections applied to the echo to compensate for range. The method of correcting a reflected sonar signal for range and other conditions is well known in the art as the sonar equation. Compensation is usually performed within the sonar.

The corrected echoes (output from box 220) are passed to the echo monitoring system associated with the sonar for review. Optionally, all echoes that have an apparent target strength greater than a threshold can be highlighted, for example, the system can be set to highlight echoes having an apparent target strength of −10 dB or greater. Those echoes not reaching the threshold can be ignored.

When a double echo is recognised the acoustic diameter is measured as described in FIG. 3 (box 222). If the acoustic diameter measured falls outside the limits of the type of reflector expected the signal is rejected otherwise the signal is accepted and the search is continued.

At this stage a further discrimination can be applied, as in acoustic reflectors of interest, the second echo in a double echo will normally be higher than the first. (This is the case when the acoustic reflectors chosen for use have been matched to the interrogating sonar.) If the peak power of the second echo is below that of the first it is less likely to be a reflector of interest.

The acoustic width (which in the case of a spherical reflector is its real diameter) is measured (box 224) as described with reference to FIG. 6. If the measured acoustic width is not within tolerance for a reflector being sought then the signal is rejected as not being of interest and the search continued.

The returned signal strength is also measured and compared with what might be expected from reflectors of interest at the observed frequencies and after corrections have been applied (box 226). If the returned signal strength is not as expected, the returned signal is rejected and the search continued.

Phase changes in the echoes and the difference in the phase change in the front echo and the echo from the rear of an object are also measured, and the response is rejected as not coming from an object of interest if the phase changes are not as expected (box 228).

The measurements set out in boxes 222 to 228 are repeated a number of times (at least three) (box 230). If consistent (boxes 232 and 234) over each of the observations and they conform to known underwater reflectors of interest (box 236), they are categorised, located and recorded (box 238). If the observations do not conform to known reflectors then the signals are rejected and the search continued.

Figure 2:
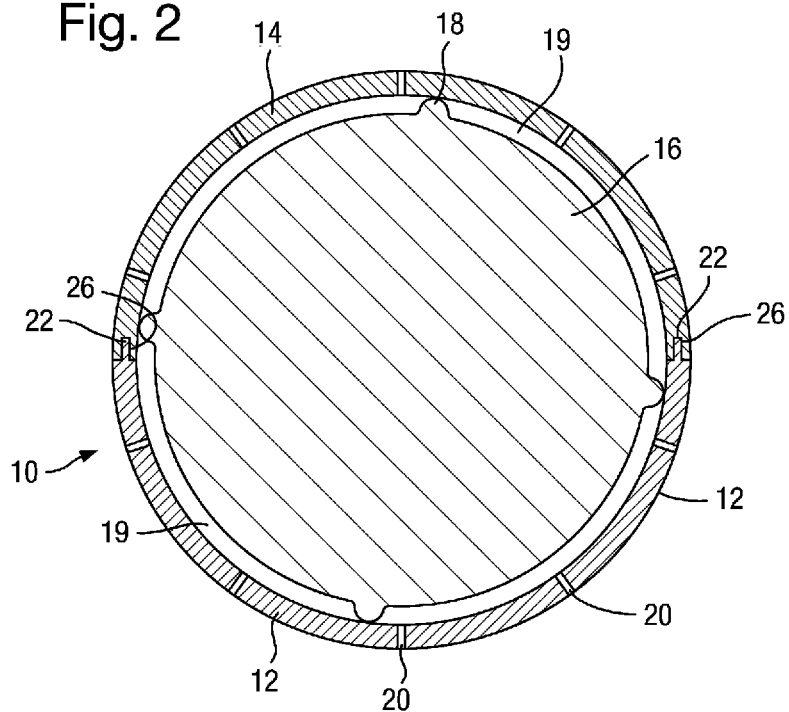
FIG. 2 is a cross section of the acoustic reflector made using the components shown in FIGS. 1A to 1C.

Acoustic reflectors of the kind described in FIGS. 1 and 2, show differential reflection characteristics at different frequencies, depending on the materials of the reflector, the thickness of the shell and the size of the reflector. Advantage can be taken of this by interrogating a possible underwater acoustic reflector with acoustic pulses at two different frequencies, one of which is a frequency at which such a reflector is known to reflect and one at which such a reflector is known not to reflect at all well. If an object reflects at the frequency at which a reflector of interest is known to reflect well but is invisible at the other frequency that information can be used further to discriminate objects of interest. This technique is especially useful as the alternating frequencies will cause an object of interest to pulse on an observer's screen, and be clear to see.

It is also now known that the use of long acoustic pulses, with a pulse length longer than twice acoustic diameter of the reflector of interest, will affect the reflections and make it difficult to pick out in the reflected signal double echoes. By using a pattern of long pulses and short pulses, it should be possible in a reflected signal from an object of interest to observe easily the double echo from the short pulse but not in the long pulse. If double echoes are seen in the response to both pulses, then the object is unlikely to be of interest. By using suitable filtering arrangements, an object of interest interrogated in this way can also be made to pulse on an observer's screen.

FIG. 8 shows the key processes of FIG. 7 being carried concurrently. The principles are the same. An object is interrogated by a sonar (box 240), with, optionally, echoes having apparent target strength greater than a threshold being highlighted. The acoustic diameter is measured as discussed with reference to FIG. 3 (box 242), the acoustic width as described with reference to FIG. 6 is also measured (box 244), frequency response and its comparison with the anticipated response observed (box 246) as is the phase response (box 248). The results are reviewed and reflectors that most meet the pre-set criteria can be highlighted on an observer's screen (box 250).

The results are stored and the observations repeated (boxes 252 and 254) at least three times and each set reviewed with the stored previous sets for consistency (boxes 256 and 258). If the results are consistent they are compared with what would be expected from known underwater reflectors, if they conform to such a known reflector (box 260), it is identified categorised and/or its location recorded (box 262).

In FIG. 8, use can be made of pulses of different frequencies or lengths as described above to provide further discrimination. It should be emphasised that in relation to FIG. 8, although identification of the characteristics are described individually, several can be measured from a single observation, then repeated in further observations for consistency (box 256), and considered for conformity to known reflectors (box 260).

FIGS. 7 and 8 show examples of a sequential scheme and a concurrent scheme for the identification of acoustic reflectors. It should be noted that these are not the only forms of scheme and others may include both sequential and concurrent elements.

The methods of FIGS. 7 and 8 leads to a very precise identification of an acoustic reflector of the kind described in FIGS. 1 and 2. Acoustic reflectors constructed from a shell surrounding a core, as previously described in FIGS. 1 and 2, are omni-directional in their response, that is the target strength, the double echo (acoustic diameter), acoustic width, frequency response and phase response measurements are the same irrespective of the angle of interrogation, in the horizontal and or vertical axis. Observing a reflector from several different positions allows the reflector responses to be measured at different angles, for example on three orthogonal axes. A comparison of the measured responses can be conducted, and if the responses are not similar, the object under observation can be rejected as a reflector of interest. Viewing an object multiple times and from multiple aspects, and comparing the responses is another method this invention uses to identify, categorise and/or locate a reflector.

On the other hand, if the reflector of interest is, say cylindrical, measurement of the key parameters from different angles will give a measurement of the aspect, and this information too can be used to identify the reflector.

The techniques described can be developed further. A number of acoustic reflectors of the kind described in FIGS. 1 and 2 can be placed along a structure, such as a pipeline. Knowing the configuration of the acoustic reflectors and the basic shape of the structure to which they are attached allows returns from reflectors to be assessed as to whether they conform to expectations (boxes 236 or 260 of FIG. 7 or 8). Reviewing the location of possible reflectors, positions not conforming to the expected shape can be dismissed. Furthermore, the method can be extended further. Because the acoustic diameters of reflectors of the kind described with reference to FIGS. 1 and 2, reflectors can be chosen such that the echoes returned from the back of the reflectors appear to have come from within the structure itself (say from the middle of the pipeline). It is thus possible using the techniques described with reference FIGS. 3 to 8 to identify one or more of the reflectors concerned and then to plot the line of the structure using the back echoes, knowing that the acoustic diameter of the reflectors makes those echoes appear to be coming from within the structure or pipeline.

A LowRance Structurescan® system is used in connection with these techniques. LowRance Structurescan® is a composite sonar, with single beam echo sounder and small side scan, these are amalgamated to provide composite side scan and down scan sonar system consisting of a transducer, processing unit and screen to interrogate a passive sonar reflector and to view the raw live data. This can be used to provide information concerning the direction and range of the identified passive acoustic reflector from the receiving sonar. Normally in the oil and gas industry the receiving sonar will be on a vessel such as an ROV/AUV 4 or surface ship, which is often moving. This creates a problem in identifying the absolute rather than the relative coordinates of the passive acoustic reflector relative to the vessel at a particular moment.

The raw data from the LowRance StructureScan is recorded in .xtf format or .s12 format. The .xtf or .s12 file is imported into a program known as SonarTRX™. This enables the raw data to be built up as a mosaic which follows the track of the vessel on which the sonar receiver is mounted logging the geographic position coordinates embedded into the .xtf or .s12 file with each sonar ping. As a result SonarTRX™ produces an .xml file (Extensible Markup Language). XML is also playing an increasingly important role in the exchange of a wide variety of data on the Web (and elsewhere) which can be viewed in Google Earth® or other Geographic Information Software. In this way, by overlaying the .xml files on the geographic information system software, latitude and longitude co-ordinates for the passive acoustic reflector concerned can be derived.

The absolute position of a series of passive acoustic reflectors can be plotted in the same way. If the series is marking say a pipeline, the absolute route of the pipeline can be traced. Previously, if a pipeline was a good acoustic reflector, the only way this could be done was to use a fixed sonar receiver. Whilst possible in a harbour where a suitable fixed point may be available, that is not practical in most off-shore oil and gas pipelines.

The invention claimed is:

1. A method of identifying and locating an underwater acoustic reflector having a shell surrounding a core wherein an incident acoustic wave may be partially reflected by a front of the reflector and partially pass into the core to be reflected from the shell at a rear of the reflector by acoustically interrogating an underwater search area in which such an acoustic reflector may be present, the method comprising:
  identifying objects that apparently reflect the acoustic interrogation with a double echo, measuring the separation of the two echoes and comparing those measurements with anticipated measurements for underwater acoustic reflectors that may be present in the search area, and accepting or rejecting the reflected acoustic wave as potentially including an echo from the front of such an acoustic reflector and an echo from the shell at the rear of the reflector,
  measuring the target strength of the echoes in a double echo received from an object and rejecting the object as not being of interest if the target strength in the first echo of a double echo exceeds that of the second echo;
  and at least one of the following acts:
  (1) measuring the total target strength of an echo from an object, the object being rejected as being a potential underwater acoustic reflector of interest if the target strength is less than a predetermined minimum;
  (2) measuring the acoustic width of an object and comparing that with the acoustic width of known acoustic reflectors, the object being rejected as being potentially an underwater acoustic reflector of interest if the acoustic width is not that of a known underwater acoustic reflector;
  (3) measuring the frequency response of an object, the object being accepted or rejected as being potentially an acoustic reflector of interest if the frequency response corresponds to the known frequency response of such an underwater reflector; and
  (4) measuring the phase response of an object, the object being accepted or rejected as potentially an underwater acoustic reflector of interest if the phase response corresponds to the known phase response of such an underwater acoustic reflector.

2. A method of identifying and locating an underwater reflector according to claim 1 further comprising measuring the acoustic diameter of an object and comparing that diameter with known acoustic diameters for underwater acoustic reflectors that may be present in the search area, and thus accepting or rejecting the reflected acoustic wave as one being one potentially of interest.

3. A method of identifying and locating an underwater acoustic reflector according to claim 1 further comprising interrogating an object with short pulses intermingled with long pulses, the short pulses being of a length that is less than twice the acoustic diameter of an underwater acoustic reflector of interest and the long pulses being longer than twice the acoustic diameter of an underwater acoustic reflector of interest.

4. A method of identifying and locating an underwater acoustic reflector according to claim 1 further comprising measuring the total target strength of an echo and rejecting the echo as coming from an underwater acoustic reflector of interest if the target strength is less than a pre-determined minimum.

5. A method of identifying and locating an underwater acoustic reflector according to claim 1 further comprising interrogating an object alternately with acoustic waves of at least two different frequencies, one of which is a frequency to which an underwater acoustic reflector being sought is known to respond and the other of which is a frequency to which underwater acoustic reflector of interest an underwater acoustic reflector will not respond strongly.

6. A method of identifying and locating an underwater acoustic reflector according to claim 1 further comprising measuring the target strength of the echoes in any double echo received from an object and rejecting the object as being an underwater acoustic reflector of interest if the target strength in the first echo of a double echo exceeds that of the second echo.

7. A method of identifying and locating an underwater acoustic reflector according to claim 1 further comprising measuring the acoustic width of an object and comparing that with the acoustic width of known acoustic reflectors, the object being rejected as being a potential underwater acoustic reflector of interest if the acoustic width is not that of a known underwater acoustic reflector.

8. A method of identifying and locating an underwater acoustic reflector according to claim 1 further comprising measuring the phase difference between the echo from the front of an object and any echo from the rear of the object, the object being accepted or rejected as being potentially an underwater acoustic reflector of interest if the said phase difference corresponds to the anticipated phase difference between the echo from the front of such a reflector and the echo from the rear of such a reflector.

9. A method of identifying and locating an underwater acoustic reflector according to claim 1 further comprising measuring the frequency response of an object, the object being accepted or rejected as being potentially an acoustic reflector of interest if the frequency response corresponds to the known frequency response of such an underwater reflector.

10. A method of identifying and locating an underwater acoustic reflector according to claim 1 wherein the method is repeated at least three times.

11. A method of identifying and locating a spherical underwater acoustic reflector according to claim 10 by interrogating such a suspected underwater acoustic reflector from at least three different aspects.

12. A method of identifying and locating an underwater acoustic reflector according to claim 1 wherein an underwater acoustic reflector of interest is non-spherical and the method includes the step of measuring the aspect of any reflected signal.

13. A method of identifying and locating an underwater acoustic reflector according to claim 1 further comprising plotting the outline of a structure by using acoustic reflectors placed on the structure.

14. A method of identifying and locating an underwater acoustic reflector according to claim 13 wherein the acoustic diameter of the reflector apparently places the source of the second echo of a double echo within the structure.

15. A method of identifying and locating an underwater acoustic reflector according to claim 1 wherein acts (1)-(4) are carried out sequentially with an object being rejected as not being an object of interest if the characteristic of the sought after underwater acoustic reflector is not identified in any one of the acts (1)-(4).

16. A method of identifying and locating an underwater acoustic reflector according to claim 1 wherein at least two of acts (1)-(4) are carried out in parallel to one another with an object being rejected as an underwater acoustic reflector not of interest if the characteristics of the sought after underwater acoustic reflector are not identified in the at least two of acts (1)-(4).

17. A method of identifying and locating an underwater acoustic reflector according to claim 1 further comprising plotting the position of one or more underwater acoustic reflectors comprises directing a sonar at a possible underwater acoustic reflector, identifying a sonar reflector as an acoustic reflector of interest, plotting the relative position of the acoustic reflector in relation to the sonar receiver, plotting the absolute position of the sonar receiver in a geographical information system, combining the position information of the acoustic reflector of interest relative to the receiver with the absolute position of the receiver, to define an absolute position of the acoustic reflector of interest in a geographic information system.

18. A method of identifying and locating an underwater acoustic reflector according to claim 17 wherein the reflector is one of a plurality of reflectors of interest attached to a pipeline and the route of the pipeline is recorded by recording the position of the reflectors.

19. A method of identifying and locating an underwater acoustic reflector according to claim 16 wherein all of act (1)-(4) are carried out in parallel to one another with an object being rejected as not being an underwater acoustic reflector of interest if the characteristics of the sought after underwater acoustic reflector are not identified in any of acts (1)-(4).

20. A system for identifying and locating an underwater acoustic reflector having a shell surrounding a core wherein an incident acoustic wave may be partially reflected by a front of the reflector and partially pass into the core to be reflected from the shell at a rear of the reflector by acoustically interrogating an underwater search area in which such an acoustic reflector may be present, the system comprising:
  a transducer configured to perform an acoustically interrogation and to detect objects which reflect the acoustic interrogation with a double echo;
  a processor configured:
    to measure separation of the two echoes and to compare those measurements with anticipated measurements for underwater acoustic reflectors that may be present in the search area, and to accept or reject the reflected acoustic wave as potentially including an echo from the front of such an acoustic reflector and an echo from the shell at the rear of the reflector, to measure the target strength of the echoes in a double echo received from an object and to reject the object as not being one of interest if the target strength in the first echo of a double echo exceeds that of the second echo;

and to perform at least one of the following acts:

(1) to measure the total target strength of an echo from an object, the object being rejected as being a potential underwater acoustic reflector of interest if the target strength is less than a predetermined minimum;

(2) measuring the acoustic width of an object and comparing that with the acoustic width of known acoustic reflectors, the object being rejected as being potentially an underwater acoustic reflector of interest if the acoustic width is not that of a known underwater acoustic reflector;

(3) to measure the frequency response of an object, the object being accepted or rejected as being potentially an acoustic reflector of interest if the frequency response corresponds to the known frequency response of such an underwater reflector; and (4) to measure the phase response of an object, the object being accepted or rejected as potentially an underwater acoustic reflector of interest if the phase response corresponds to the known phase response of such an underwater acoustic reflector.

* * * * *